United States Patent
Sartor et al.

(10) Patent No.: US 12,340,540 B2
(45) Date of Patent: Jun. 24, 2025

(54) IMAGING SENSOR, AN IMAGE PROCESSING DEVICE AND AN IMAGE PROCESSING METHOD

(71) Applicant: Sony Group Corporation, Tokyo (JP)

(72) Inventors: Piergiorgio Sartor, Stuttgart (DE); Alexander Gatto, Stuttgart (DE); Vincent Parret, Stuttgart (DE); Adriano Simonetto, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 492 days.

(21) Appl. No.: 17/774,868

(22) PCT Filed: Nov. 12, 2020

(86) PCT No.: PCT/EP2020/081926
§ 371 (c)(1),
(2) Date: May 6, 2022

(87) PCT Pub. No.: WO2021/094463
PCT Pub. Date: May 20, 2021

(65) Prior Publication Data
US 2022/0405972 A1    Dec. 22, 2022

(30) Foreign Application Priority Data
Nov. 15, 2019 (EP) ..................................... 19209390

(51) Int. Cl.
*G06T 7/90* (2017.01)
*G06T 3/4053* (2024.01)

(52) U.S. Cl.
CPC .............. *G06T 7/90* (2017.01); *G06T 3/4053* (2013.01); *G06T 2207/10024* (2013.01); *G06T 2207/20081* (2013.01); *G06T 2207/20084* (2013.01)

(58) Field of Classification Search
CPC ..................... G06T 7/90; G06T 3/4053; G06T 2207/10024; G06T 2207/20081; G06T 2207/20084
See application file for complete search history.

(56) References Cited

FOREIGN PATENT DOCUMENTS

| CN | 104112263 A | * | 10/2014 | |
|----|-------------|---|---------|--|
| CN | 107230185 A | * | 10/2017 | ........... G06T 3/4061 |
| CN | 109146831 A | * | 1/2019  | ........... G06N 3/0454 |
| CN | 109509160 A |   | 3/2019  | |

(Continued)

OTHER PUBLICATIONS

International Search Report and Written Opinion mailed on Dec. 23, 2020, received for PCT Application PCT/EP2020/081926, Filed on Nov. 12, 2020, 9 pages.

(Continued)

*Primary Examiner* — Vincent Rudolph
*Assistant Examiner* — Bradley O Felix
(74) *Attorney, Agent, or Firm* — XSENSUS LLP

(57) ABSTRACT

An image processing device has circuitry, which is configured to obtain global image data including image data and spectral data, the global image data representing a global image area and to input the global image data to machine learning model for generating output spectral data, wherein the neural network is configured to transform the obtained image data into the output spectral data based on the obtained spectral data.

5 Claims, 6 Drawing Sheets

(56) References Cited

FOREIGN PATENT DOCUMENTS

| | | | | |
|---|---|---|---|---|
| CN | 109614996 A | * | 4/2019 | ........... G06K 9/6256 |
| CN | 109640008 A | * | 4/2019 | |
| CN | 110175971 B | * | 9/2022 | ............ G01J 3/2803 |

OTHER PUBLICATIONS

Cao et al., "High Resolution Multispectral Video Capture with a Hybrid Camera System", Available Online at: https://www.microsoft.com/en-us/research/wp-content/uploads/2016/12/cvpr11.pdf, Jun. 20-25, 2011, 8 pages.

Lin et al., "Endoscopic Depth Measurement and Super-Spectral-Resolution Imaging", arXiv:1706.06081v2, Jun. 21, 2017, pp. 1-9.

Han et al., "SSF-CNN: Spatial and Spectral Fusion With CNN for Hyperspectral Image Super-Resolution", IEEE, ICIP 2018, pp. 2506-2510.

* cited by examiner

IMAGING SENSOR, AN IMAGE PROCESSING DEVICE AND AN IMAGE PROCESSING METHOD

CROSS-REFERENCE TO RELATED APPLICATIONS

The present application is based on PCT filing PCT/EP2020/081926, filed Nov. 12, 2020, which claims priority to European Patent application No. 19209390.4, filed Nov. 15, 2019, the entire contents of each are incorporated herein by reference.

TECHNICAL FIELD

The present disclosure, generally pertains to an imaging sensor, an age processing device and an image processing method.

TECHNICAL BACKGROUND

Generally, neural networks, such as Deep Neural Network (DNN) and Convolutional Neural Network (CNN) are known, and they are used in a plurality of technical fields, for example in image processing. Known image processing devices may use DNN and CNN for image reconstruction, multispatial and multispectral image transformation, multispatial and multispectral image generation, object recognition and the like.

Moreover, DNN and CNN typically have an input layer, an output layer and multiple hidden layers between the input layer and the output layer. In image processing, a neural network may be trained to output images having high spectral resolution, using as an input to the neural network, a color channel image, such as an RGB image (having red, green and blue color channels), captured by a color sensor, and a spectral channel image, such as a multispectral or hyperspectral image, capture by multispectral sensor.

Although there exist techniques for image processing, it is generally desirable to improve imaging sensors, image processing devices and methods.

SUMMARY

According to a first aspect, the disclosure provides an image processing device comprising circuitry configured to obtain global image data including image data and spectral data, the global image data representing a global image area, to input the global image data to a machine learning model for generating output spectral data, wherein the machine learning model is configured to transform the obtained image data into the output spectral data based on the obtained spectral data.

According to a second aspect, the disclosure provides an image processing method comprising obtaining global image data including image data and spectral data, the global image data representing a global image area, inputting the global image data to a machine learning model for generating output spectral data, wherein the machine learning model is configured to transform the obtained image data into the output spectral data based on the obtained spectral data.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
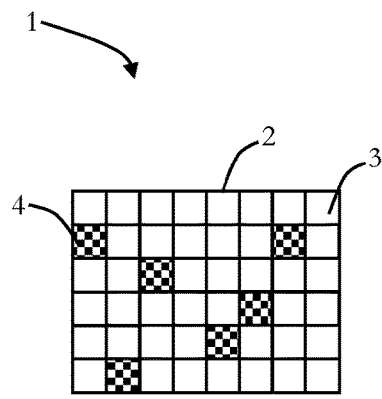
FIG. 1 illustrates an exemplary embodiment of an imaging sensor.

Before a detailed description of the embodiments under reference of FIG. 1 is given, general explanations are made.

As indicated in the outset, it is generally known that multispectral imaging systems and common Red Green Blue (RGB) imaging systems are used to capture and analyze images having high spectral resolution and high spatial resolution, respectively. Typically, a multispectral imaging device provides higher resolved spectral information than a common RGB imaging system, which typically only provides color channel information, namely for the red, green and blue colors. A multispectral sensing device is usually more expensive than an RGB imaging device and typically a multispectral sensing device compromises resolution, acquisition time and cost.

Generally, the spatial resolution of a mosaic-array multispectral sensor may be lower than the spatial resolution of a common RGB sensor. However, since the design costs of a common RGB sensor, usually, are less, than the costs of a multispectral sensor, most imaging systems focus on spatial resolution rather than spectral, resolution.

It is known that multispectral imaging systems perform hyper/multispectral image data reconstruction on the basis of an RGB image, using deep learning techniques, in order to benefit from both spatial and spectral resolution information.

As mentioned in the outset, neural networks, such as Deep Neural Network (DNN) and Convolutional Neural Network (CNN) are known, and they have reached state-of-the-art level performance in many domains, such as of image processing, image reconstruction, multispatial and multispectral image generation, language processing and the like. CNN is a part of DNN that are usually applied to analyzing visual imagery.

In particular, CNN uses image classification algorithms for image transformation, multispatial and multispectral image generation, image classification, image and video recognition, natural language processing and the like.

As it is generally known, a CNN, may have an input layer and an output layer, as well as multiple hidden layers. The hidden layers of a CNN typically have a number, of convolutional layers i.e. pooling layers, fully connected layers and the like. Each convolutional layer within a neural network usually has attributes, such as an input having shape (number of images)×(image width)×(image height)×(image depth), a number of convolutional kernels, acting like a filter, whose width and height are hyper-parameters, and whose depth must be typically equal to that of the image. The convolutional layers convolve the input and pass their result to the next layer.

In some cases, it may be suitable, that the Conventional CNN is trained such as to reconstruct a hyper/multispectral image from an RGB image captured by an RGB sensor and a hyperspectral image, captured by hyperspectral sensor. In such cases, the CNN may be trained to integrate data acquired from the different capturing systems and to perform an alignment process and/or interpolation process of RGB image data representing the captured RGB image to the hyper/multispectral image data representing the captured hyper/multispectral image.

However, it has been recognized that, for example, in particular situations, multi-spectral imaging is desired, combining high resolution, and large number of acquisitions (depending on acquisition time) or quick acquisitions (depending on acquisition time). In such cases, it has been recognized that a Conventional CNN may not be suitable, since the resolution of a hyper/multispectral image is higher than the resolution of an RGB image, that is, a hyper/multispectral image has a few hundred pixels more than an RGB image, and by using alignment process and/or interpolation process of the two different images may result to information loss. Moreover, in such cases, two distinct sensors are required, in order to capture the two different images.

Consequently, some embodiments pertain to an imaging sensor including a photosensitive area, which includes an imaging part and a spectral imaging part.

The imaging sensor may be any high resolution/high speed RGB imaging sensor, or the like. The imaging sensor may be specifically designed for sensing light of different wavelength range depending on the filter applied on its pixels, which may be arranged in pixel array in a sensor plane. At least one of the pixels of the sensor may be a multi/hyperspectral pixel having a sensitivity in a multi- or hyperspectral range. The image sensor may generate image data on the basis of the wavelength range of an incoming light.

The photosensitive area may be an area, such as the, or corresponding to the photosensitive sensor plane, formed by an array of pixels in some embodiments. The photosensitive area includes an imaging part and a spectral imaging part. The photosensitive area may be based on at least one of the following: CMOS (Complementary Metal Oxide Semiconductor), CCD (Charge Coupled Device), SPAD (Single Photon Avalanche Diode), CAPD (Current Assisted Photodiode) technology or the like.

The imaging part may be a common color channel imaging part, such as a common RGB (Red, Green, Blue) imaging part, having a plurality of pixels, for sensing light of different wavelength ranges, namely of red light, green, light and blue light, without limiting the present disclosure in that regard. The plurality of pixels of the imaging part may sense any other light color (channels).

In particular, the color channel of a specific color, for example red, green, or blue, may include information of multiple spectral channels that corresponds to the wavelength range of red, green, or blue, respectively. That is, the color channels may be considered as an integration of the corresponding (multiple) spectral channels located in the wavelength range of the associated color channel.

The spectral imaging part may be a spectral channel imaging part having, for example, at least one imaging portion for sensing light of different wavelength ranges or spectral ranges. In particular, the spectral imaging part may be specifically designed for sensing light of different wavelength range or spectral range depending on the filter applied on the at least one imaging portion. For example, different kind of color filters, spectral filters or the like may be applied on the spectral imaging part than the kind of color filters, spectral filters or the like applied on the RGB pixels of the imaging part. Therefore, spectral pixels may be sensitive to different wavelength range or spectral range than the RGB pixels of the photosensitive area of the imaging sensor.

In some embodiments, the spectral imaging part may include a plurality of spectral imaging portions, such as pixels. The plurality of spectral imaging portions may be distributed in the photosensitive area or at least a part of the plurality of spectral imaging portions, may be grouped in a region of the photosensitive area or at least one cluster including a plurality of spectral imaging portions may be distributed in the photosensitive area or the spectral imaging portions may be located in the photosensitive area with any combination of all the above. Each of the pixels may be configured to detect light in a specific spectral range of the overall to be detected multispectral or hyperspectral wavelength or spectral range.

The plurality of spectral imaging portions may be arbitrarily distributed in the photosensitive area or may be distributed based on a predetermined pattern. In addition, the plurality of spectral imaging portions may be embedded in the photosensitive area together with the imaging, part (and/or the pixels of the imaging part).

For example, returning to FIG. 1, an exemplary embodiment of an imaging sensor is illustrated, which includes an imaging part and a spectral imaging part, as discussed herein.

As mentioned above, an imaging sensor, such as imaging sensor 1 of FIG. 1 has a photosensitive area 2, which in turn includes an imaging part 3 and a spectral imaging part 4. The imaging part 3 is represented by white colored squares and the spectral imaging part 4 is represented by chess patterned squares. In this embodiment, the spectral imaging part 4 has a plurality of spectral imaging portions, which are distributed in the photosensitive area 2. The imaging part 3 and the spectral imaging part 4 may each have a filter for filtering appropriately the wavelength of an incoming light. For example, information is acquired from the imaging part 3, such as imaging information (e.g. red, green and blue color channel information) and information is acquired from the spectral imaging part 4, such as spectral information. The information acquired from the imaging part 3 and the spectral imaging part 4 is represented by image data and spectral data, respectively.

The imaging sensor 1 generates, for example, global image data, including image data and spectral data that represent imaging information and spectral information, respectively, which is described under the reference of FIGS. 3 to 5 further below.

Some embodiments pertain to an image processing device including circuitry configured to obtain global image data including image data and spectral data, the global image data representing a global image area, and to input the global image data to a machine learning model for generating output spectral data, wherein the machine learning model is configured to transform the obtained image data into the output spectral data based on the obtained spectral data.

The image processing device may be a digital (video) camera, a surveillance camera, a biometric device, a security camera, a medical/healthcare device, a remote sensing device, a food inspection device, an edge computing enabled image sensor, such as smart sensor associated with smart speaker, or the like, a motor vehicles device, a smartphone, a personal computer, a laptop computer, a personal computer, a wearable electronic device, electronic glasses, or the like, a circuitry, a processor, multiple processors, logic circuits or a mixture of those parts.

The circuitry may include one or more processors, logical circuits, memory (read only memory, random memory, etc., storage memory, i.e. hard disc, compact disc, flash drive, etc), an interface for communication via a network, such as a wireless network, internet, local area network, or the like, a CMOS (Complementary Metal Oxide Semiconductor) image sensor, a CCD (Charge Coupled-Device) image sensor, or the like, and it may include the image sensor discussed herein.

The global image data may be generated by the image sensor, as mentioned above. The global image data may be also obtained from a memory included in the device, from an external memory, etc., from an artificial image generator, created via computer generated graphics, or the like.

The image data may be Red Green Blue (RGB) image data. The image data may be represented by a number of color channels, for example three color channels, such as Red, Green and Blue, or the like. The color channel of a specific color, for example red, green, or blue, may include information of multiple spectral channels that corresponds to the wavelength range of red, green, or blue, respectively. That is, the color channels may be considered as an integration of the corresponding (multiple) spectral channels located in the wavelength range of the associated color channel. Moreover, the global image data represent a global image area, which, for example, formed by a plurality of pixels.

The spectral data may be represented by any number of spectral channels. The spectral data may be represented by multiple spectral channels, and may be spectral data, such as multispectral data or hyperspectral data.

The above mention image processing device may be part of an image processing system, such as a digital camera, an RGB camera, a surveillance camera, image acquisition systems, professional cameras, industrial equipment, or the like. An exemplary embodiment of an image processing system, including an image processing device, is described in the following under the reference of FIG. 2.

Figure 2:
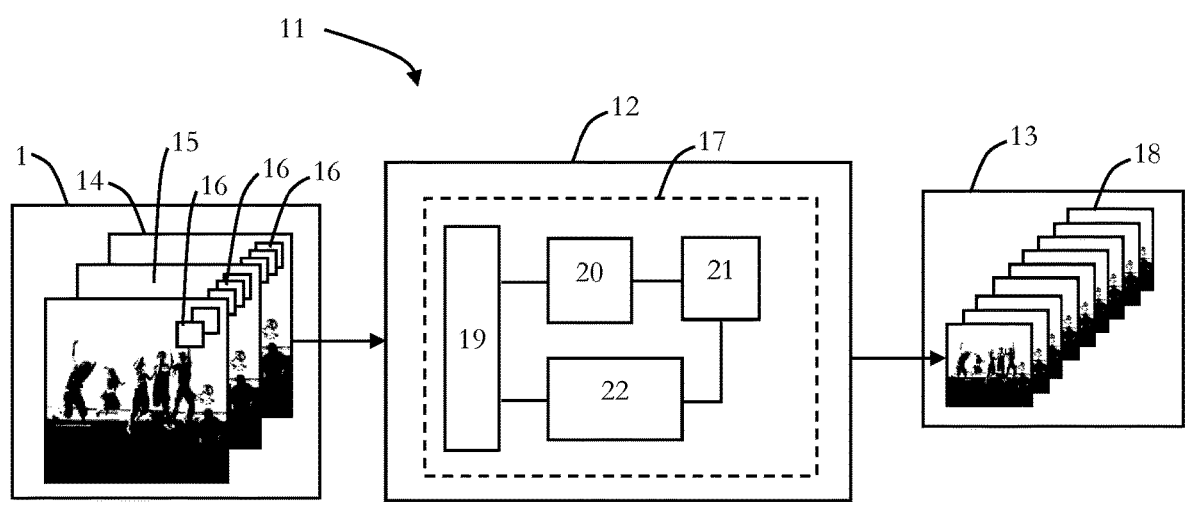
FIG. 2 shows a block diagram of an embodiment of an image, processing system.

FIG. 2 shows a block diagram of an embodiment of an image, processing system, which comprises an image processing device, as described herein.

An image processing system, such as the digital camera 11, has an image sensor, such as the imaging sensor 1, described under the reference of FIG. 1 above, an image processing device 12, and a display 13. In the present embodiment, the image processing device 12 includes a circuitry 17 with an interface 19, a Central Processing Unit (CPU) 20, including multiple processors including Graphics Processing Units (GPUs), a memory 21 that includes a RAM, a ROM and a storage memory and a trained CNN 22 (which is stored in a memory).

The image processing device 12 acquires, through the interface 19, data, such as global image data 14, including image data, such as image data 15 and spectral data, such as spectral data 16. The global image data 14 represent an image of a target scene been captured with the digital camera 11. The image data 15 are represented by a number of color channels, namely Red, Green and Blue, in this embodiment. In addition, the image data 15 represent imaging information that corresponds to information acquired from the imaging part 3 of the photosensitive area 2 of the imaging sensor 1 of FIG. 1. The spectral data 16 are multispectral image data, which are represented by a number of spectral channels. The spectral data 16 represent spectral information, that corresponds to information acquired from the spectral imaging part 4 of the photosensitive area 2 of the imaging sensor 1 of FIG. 1. In this embodiment, the spectral information is acquired from a plurality of spectral imaging portions grouped in the right upper region of the photosensitive area 2 of the imaging sensor 1 of FIG. 1, without limiting the present disclosure in that regard.

The global image data 14, being represented by a number of color channels, are transmitted to the CPU 20, which inputs the global image data 14 into the CNN 22 for generating multispectral data, being represented by a number of spectral channels. The CNN 22 has been trained in advance to transform the obtained image data 15 into the multispectral data, such as output spectral data 18, based on the obtained spectral data 16. The output spectral data 18 represent an output image being displayed on the display 13.

The implementation of the above described image processing system 11, having the image sensor 1, may result to high-resolution multi-spectral, imaging by means of full resolution RGB (or similar) imaging and low-resolution multi-spectral imaging. Hence, a multi/hyperspectral device may be designed having a low cost, high resolution, and high acquisition speed.

The CNN 22 may be a CNN trained from the scratch using a machine-learning algorithm or may be a CNN trained using a previously trained machine-learning algorithm.

As mentioned above, the global image data 14, including image data 15 and spectral data 16, represent a global image area, which, for example, formed by a plurality of pixels. In some embodiments, the global image area may include more pixels represented by the obtained image data than pixels represented by the obtained spectral data (i.e. the pixels representing spectral information may be sparse compared to the pixels representing imaging information (RGB information)). The obtained spectral data may represent spectral information and the obtained image data may represent imaging information. In some embodiments, the imaging information may correspond to information acquired from an imaging part of a photosensitive area of an imaging sensor, such as the imaging part 3 of the photosensitive area 2 of the imaging sensor 1 of FIG. 1. Accordingly, the spectral information may correspond to information acquired from a spectral imaging part of a photosensitive area of an imaging sensor, such as the spectral imaging part 4 of the photosensitive area 2 of the imaging sensor 1 of FIG. 1.

Figure 3:
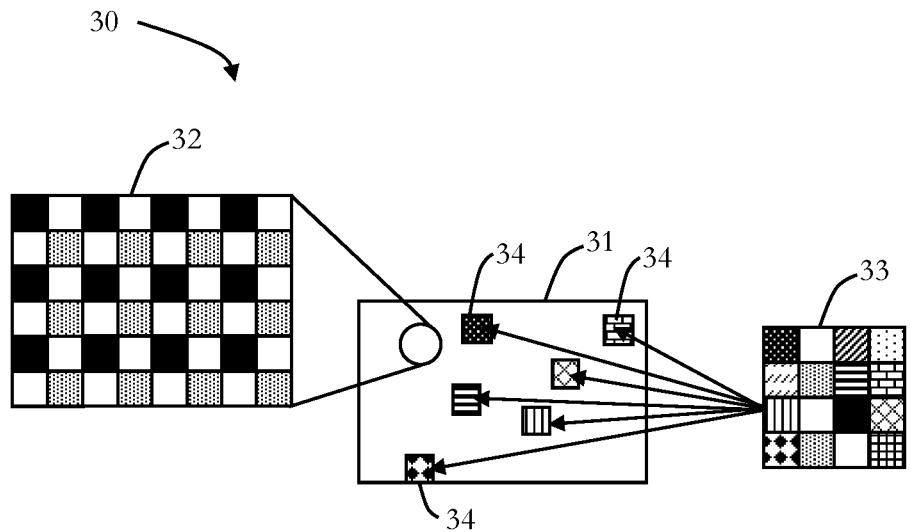
FIG. 3 shows an embodiment of a global image area, in which spectral information is distributed.
Figure 4:
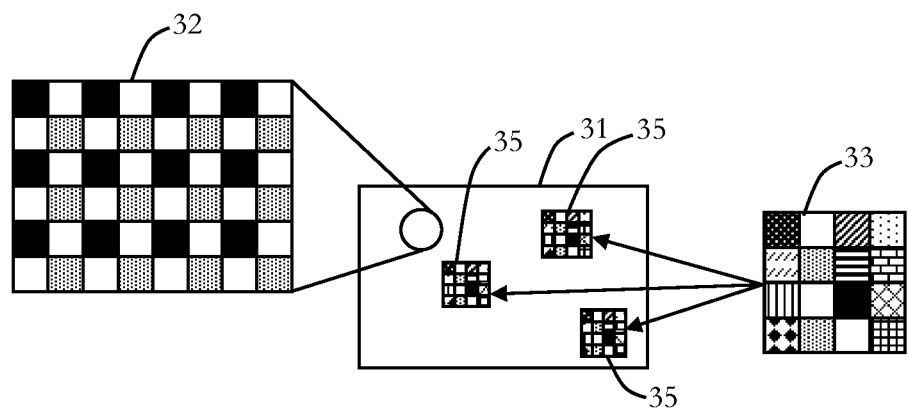
FIG. 4 shows an embodiment of a global image area, in which spectral information is distributed in clusters.
Figure 5:
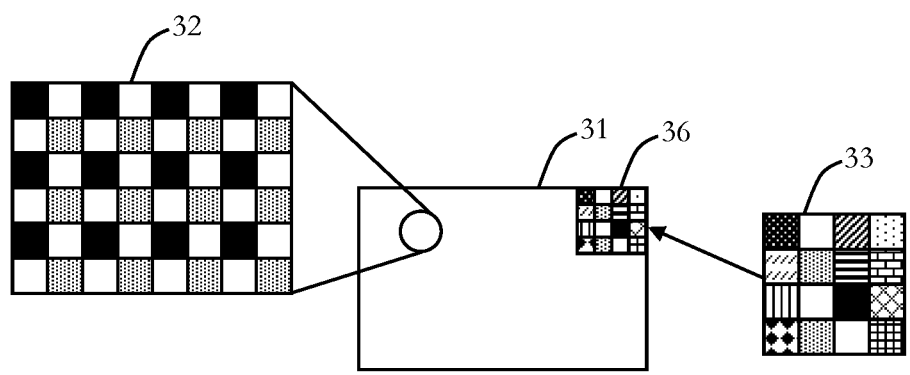
FIG. 5 shows an embodiment of spectral information being grouped in a region of a global image area.

Exemplary embodiments of global image data, including image data and spectral data that represent imaging information and spectral information, respectively, distributed in a global image area, as described herein, are illustrated in FIGS. 3 to 5 in the following.

FIG. 3 shows an embodiment of global image data representing a global image area, in which spectral information, acquired from spectral imaging portions of an imaging sensor, is distributed. In particular, an imaging sensor, such as the imaging sensor 1 generates global image data 14, including image data 15 and spectral data 16, as discussed herein. The global image data 14 represent a global image area, such as image 31. The image data 15 represent imaging information 32 and the spectral data 16 represent spectral imaging information 33. The spectral imaging information 33 is acquired from a plurality of spectral imaging portions distributed in a photosensitive area of an imaging sensor, such the photosensitive area 2 of the imaging sensor 1 of FIG. 1. That is, from each of the plurality of spectral imaging portions, sub-spectral imaging information 34 is acquired. Therefore, the spectral imaging information 33 is distributed in the global image area, in this embodiment.

An embodiment of spectral information, acquired from spectral imaging portions of an imaging sensor, being distributed in clusters in a global image area, is shown in FIG. 4. As described under the reference of FIG. 3, an imaging sensor, such as the imaging sensor 1 generates global image data 14, including image data 15 and spectral data 16. The global image data 14 represent a global image area, such as image 31, in, which imaging information 32 and spectral imaging information 33, is distributed. The spectral imaging information 33 is acquired from a plurality of spectral imaging portions grouped in clusters and distributed in a photosensitive area of an imaging sensor, such the photosensitive area 2 of the imaging sensor 1 of FIG. 1 Therefore, the spectral imaging information 33 is distributed in clusters 35 in the global image area, in this embodiment.

Another embodiment of spectral information, acquired from spectral imaging portions of an imaging sensor, being grouped in a region of a global image area, is illustrated in FIG. 5. An imaging sensor, such as the imaging sensor 1 generates global image data 14, including image data 15 and spectral data 16, as discussed herein. The spectral imaging information 33, represented by spectral data, is acquired from a plurality of spectral, imaging portions grouped in a region of a photosensitive area of an imaging sensor, such the photosensitive area 2 of the imaging sensor 1 of FIG. 1 Therefore, the spectral imaging information 33 is grouped in a region 36 of the right upper corner of the global image area, in this embodiment.

The embodiments described above under the reference of FIGS. 3 to 5 do not limit the present disclosure in that regard. The spectral imaging information may be distributed in the global image area, with any combination of the above mentioned distribution methods.

In some embodiments, the machine learning model may be a neural network and in particular, the machine learning model may be a convolutional neural network (CNN), without limiting the present disclosure in that regard. For example, in some embodiments, the convolutional neural network may include convolutional layers, or may also include local or global pooling layers, such as max-pooling layers, which reduce the dimensions of the image data, as it is generally known. The pooling layers may be used for pooling, which is a form of non-linear down-sampling, such as spatial pooling, namely max-pooling, average pooling, sum pooling, or the like.

The generation of the output spectral data may be performed either during a training phase of a neural network, such as a CNN, or may be a generation of the output spectral data with an already trained neural network, such as a trained CNN, for example, for extracting information from the image data (e.g. object recognition, or recognition of other information in the image data, such as spatial information, spectral information, patterns, colors, etc). Hence, the neural network may be a trained neural network or an un-trained neural network, wherein the un-trained neural network may be trained on-the-fly, e.g. during operation of the associated (image processing) device.

Moreover, the neural network may be part of the image processing device, e.g. stored in a storage or memory of the image processing device, or the image processing device may have access to a neural network, e.g. based on inter-processor communication, electronic bus, network (including internet), etc.

Figure 6:
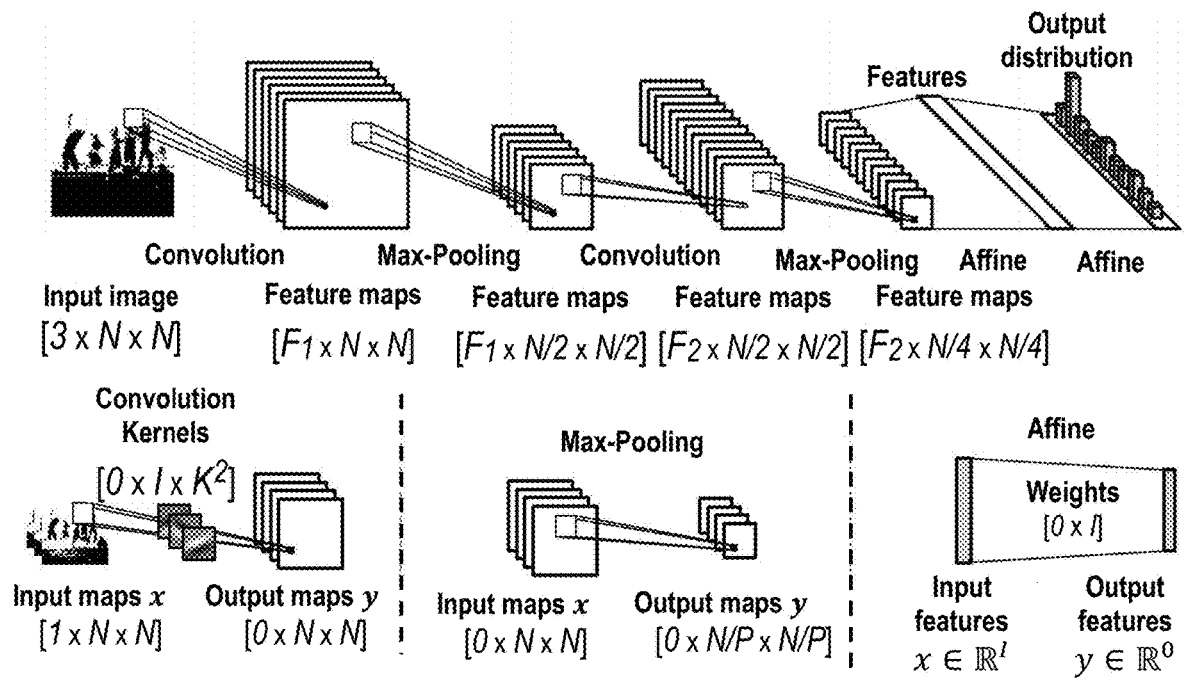
FIG. 6 visualizes the application of a Convolutional Neural Network.

The general principle of the usage of the CNN is exemplary illustrated in FIG. 6, which shows generally in the first line the CNN structure, and in the second line the basic principle of building blocks. The principles of a CNN and its application in imaging is generally known and, thus, it is only briefly discussed in the following under reference of FIG. 6.

The input image includes for example three maps or layers (exemplary red, green and blue (RGB) color information) and N times N blocks. The CNN has a convolutional layer and a subsequent pooling layer, wherein this structure can be repeated as also shown in FIG. 6. The convolutional layer includes the neurons. By applying a kernel (filter) (see convolution kernels in the second line) on the input image, a respective feature map can be obtained. The pooling layer, which is based in the present embodiment on the Max-Pooling (see second line, "Max-Pooling), takes the information of the most active neurons of the convolution layer and discards the other information. After several repetitions (three in FIG. 6), the process ends with a fully-connected layer, which is also referred to as affine layer. The last layer includes typically a number of neurons, which corresponds to the number of object classes (output features) which are to be differentiated by the CNN. The output is illustrated in FIG. 6, first line, as an output distribution, wherein the distribution is shown by a row of columns, wherein each column represents a class and the height of the column represents the weight of the object class. The different classes correspond to the output or image attribute features, which are output by the CNN. The classes are, for example, "people, car, etc." Typically several hundred or several thousand of classes can be used, e.g. also for object recognition of different objects.

In some embodiments, the convolutional neural network (CNN) may be trained based on the obtained image data and the obtained spectral data. Thus, in some embodiments, the convolutional neural network may be trained to transform the obtained image data into the output spectral data based on spectral information acquired from a plurality of spectral imaging portions of a photosensitive area of an imaging sensor.

As discussed herein, the CNN may be a trained CNN or, may be an untrained CNN. The training options of a CNN, as discussed above, is described under the reference of FIG. 7 in the following.

Figure 7:
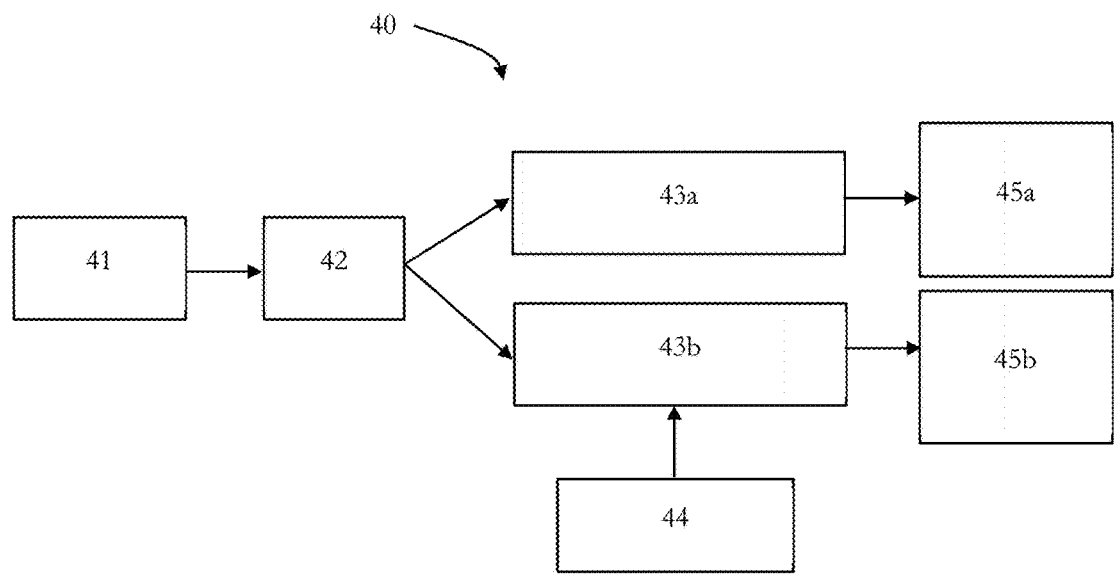
FIG. 7 shows a block diagram of an embodiment of a learning system.

An embodiment of a learning system 40, shown as a block diagram, is illustrated in FIG. 7 that generates a machine-learning model based on which a neural network, such as CNN 22 is trained.

The learning system 40 includes data acquisition 41, data set 42, a training 43a from the scratch of a system, such as machine learning algorithm, or a training 43b of a pre-trained system, such as a machine-learning algorithm, based on a pre-trained model 44, and a machine-learning model 45a and 45b.

Global image data 14 including image data 15 and spectral data 16, representing a number of images, for example, a hundred to a thousand (100-1000) images, are acquired during data acquisition 41, and thus, the data set 42 is generated and stored into the memory 21 of the image processing device 12. The number of a hundred to a thousand (100-1000) images is a relatively large number of images, which results in enough data to train a machine-learning algorithm. The machine-learning algorithm may be trained with a training 43a, such as a training from the scratch. The CNN 22 may be trained with the machine-learning algorithm, such as to use, as ground truth, the spectral information 33, acquired from the spectral imaging portions included in the spectral imaging part 4 of the imaging sensor 1 of FIG. 1, having for example, a plurality of multi/hyperspectral pixels. The CNN 22 is further trained to transform the imaging information 32, acquired from the imaging part 3 of the imaging sensor 1 of FIG. 1, having for example Red, Green, Blue (RGB) pixels, to multi/hyperspectral information, such as the information represented by the output spectral data 18 of FIG. 2, based on the spectral data 16 representing spectral information 33. The learning system 40 generates a learned model 45a, which is stored into the memory 21 of the image processing device 12.

Alternatively, a training 43b of a pre-trained system may be used to perform the same transformation, requiring fewer acquisitions. The pre-trained system may be trained based on a pre-trained model 44. The learning system 40 generates a learned model 45b, which is stored into the memory 21 of the image processing device 12.

The training process may be, realized in the image processing system 11, such as a camera, in a cloud service, in a user computer, in a dedicated device, or the like.

Some embodiments pertain to an image processing method, which may be performed by the image processing device described herein, or any other electronic device, processor, or other computing means or the like. The method includes obtaining global image data including image data and spectral data, the global image data representing a global image area, and inputting the global image data to a machine learning model for generating output spectral data, wherein the machine learning model is configured to transform the obtained image data into the output spectral data based on the obtained spectral data.

As mentioned, the global image area may include more pixels represented by the obtained image data than pixels represented by the obtained spectral data. In addition, the obtained spectral data may represent spectral information and the obtained image data may represent imaging information. The spectral information may correspond to information acquired from a spectral imaging part of a photosensitive area of an imaging sensor. Moreover, the machine learning model a neural network and, in particular, the machine learning model may be a convolutional neural network, which may be trained based on the obtained image data and the obtained spectral data. Furthermore, the convolutional neural network may be trained to transform the obtained image data into the output spectral data based on spectral information acquired from a plurality of spectral imaging portions of a photosensitive area of an imaging sensor. The convolutional neural network may be trained based on a learning algorithm, the learning algorithm computing the loss function corresponding to the image data and the loss function corresponding to the spectral data.

Figure 8:
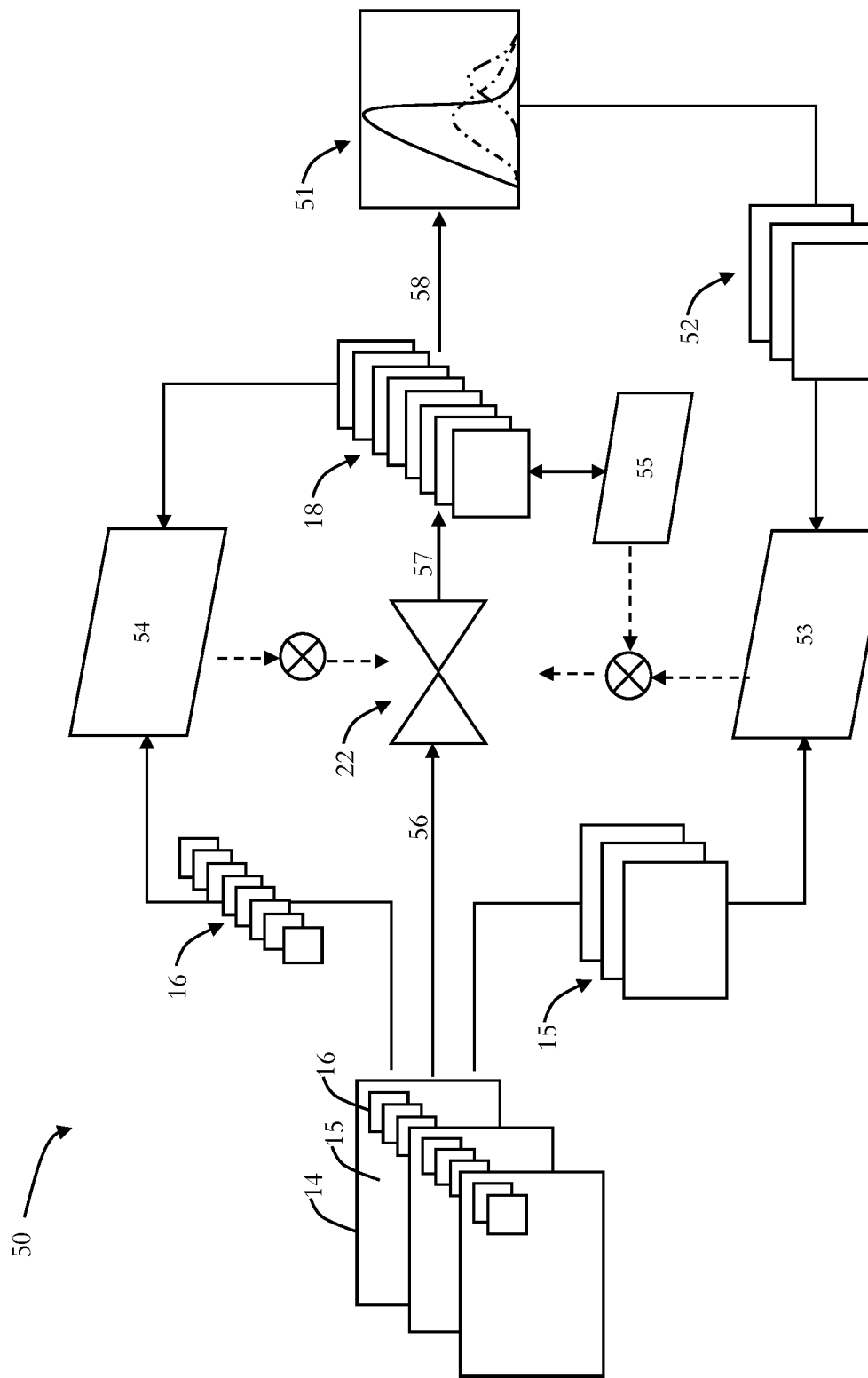
FIG. 8 illustrates an embodiment of a processing scheme of a learning method of a Convolutional Neural Network.

Referring to FIG. 8, an embodiment of a processing scheme of a learning method 50 of the CNN 22 is illustrated, in which, the obtained image data 15 are transformed into the output spectral data 18 based on the obtained spectral data 16.

The image processing device 12 inputs (arrow 56) into the CNN 22 the global image data 14, which include the image data 15, such as RGB image data and the spectral data 16, such as multispectral/hyperspectral data. As discussed herein, the global image data 14 represent a global image area, in which the number of pixels represented by the image, data 15 is larger than the number of pixels represented by the spectral data 16. Thus, the global image data 14 represent an RGB image having sparse multispectral/hyperspectral information. The CNN 22 predicts spectral data (arrow 57), such as multispectral/hyperspectral data, and outputs this as output spectral data 18 (e.g. after the following learning process). The predicted spectral data are converted (arrow 58) back to image data 52 using a back transformation 51. The back transformation 51 is performed, using a physical model, and, in particular, by integrating the spectrum according to certain color sensitivities (red, green, blue). An RGB loss function 53 indicating a loss in the RGB domain is computed, based on the image data 15 and the back-transformed image data 52, which then is fed to the CNN 22. Accordingly, a spectral loss function 54 indicating a loss in the spectral domain is computed, based on the spectral data 16 and the predicted spectral data, which then is fed to the CNN 22. The spectral loss function 54 may be, for example, a one-to-one comparison of predicted spectral data, with the closest (e.g. according to RGB values) multispectral/hyperspectral data available from the sparse spectral information. In addition, a smoothening 55 is performed on the predicted spectral data, for example, a total variation minimization. The RGB loss function 53 and the spectral loss function 54 may be used consecutively, for example by first training a convolutional neural network by using the loss in the RGB domain, such as the RGB loss function 53, with a smoothness constraint of the smoothening 55, and then fine-tuning the learning model 45a, 45b by using the sparse multispectral/hyperspectral information.

Figure 9:
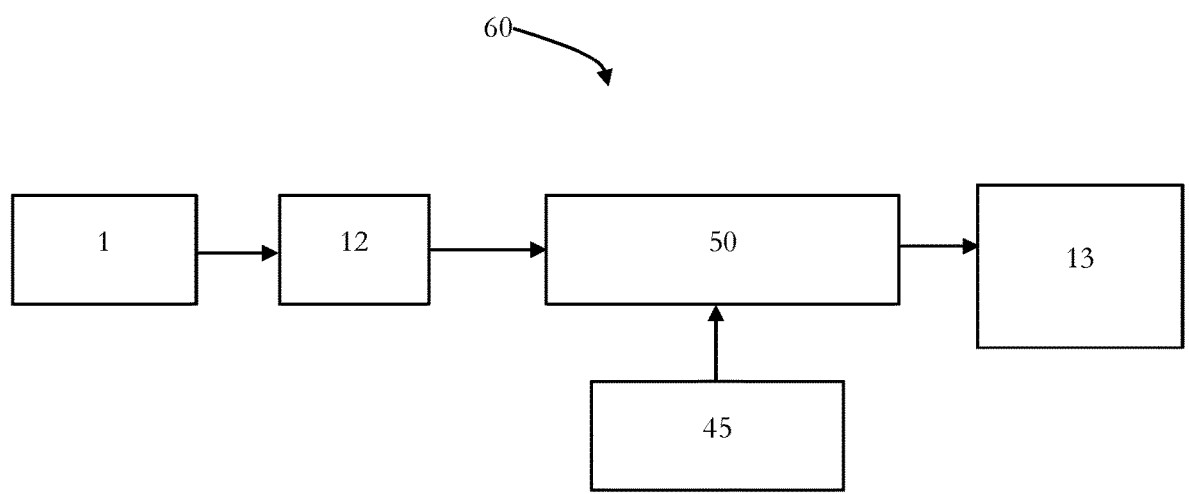
FIG. 9 illustrates an embodiment of a proposed system, which is trained based on a machine-learning model using the learning method of FIG. 8.

An embodiment of a proposed system 60, in which the image processing system 11 including the imaging sensor 1, the image processing device 12 and the display 13, is trained based on the machine-learning model 45a, 45b, using the learning method 50, is illustrated in FIG. 9 as a block diagram.

As mentioned above, the imaging sensor 1 is a high resolution/high speed RGB sensor, which acquires global image data 14 including image data 15 representing high-resolution RGB images and spectral data 16 representing low-resolution multi/hyperspectral images. The global image data 14 are input into the image processing device 12 for generating output spectral data 18 representing multi/hyperspectral images, which may be displayed on the display 13. The output spectral data 18 are generated by the CNN 22, which is trained based on the machine-learning model 45 (45a or 45b), using the learning method 50. Using the learning method 50, the image data 15 are transformed into the output spectral data 18 based on the spectral data 16, as discussed herein.

Figure 10:
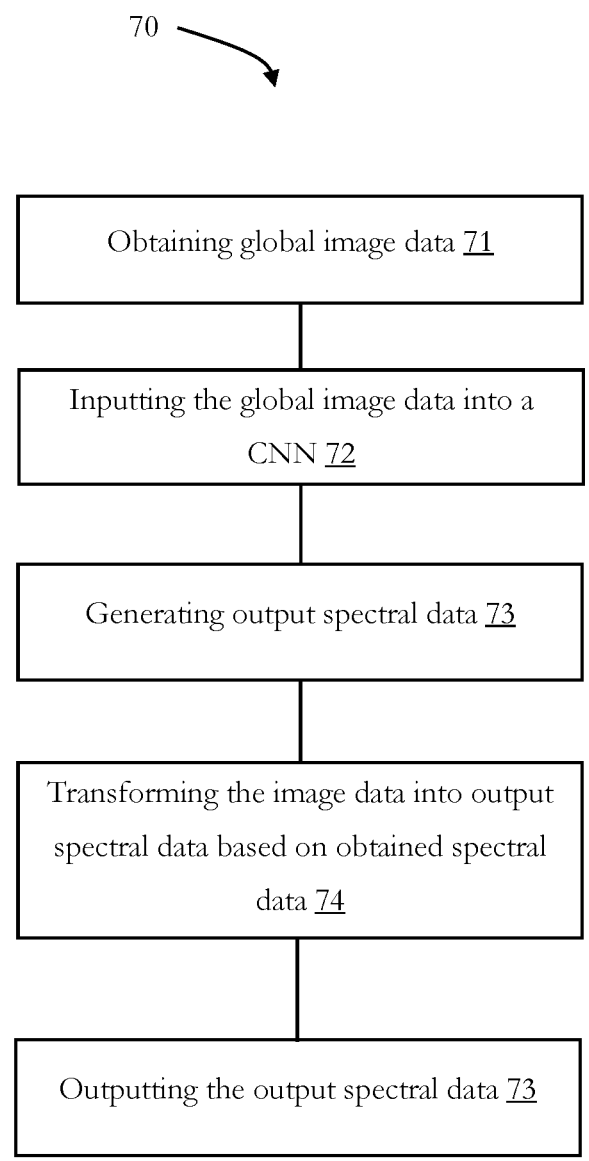
FIG. 10 is a flowchart of an embodiment of an image processing method.

In the following, an image processing method 70, which is performed by the image processing device 12 and/or the image processing system 11 in some embodiments, is discussed under reference of FIG. 10.

At 71, global image data, such as global image data 14, are obtained by the image processing device 12 and/or the image processing system 40, as discussed above.

The global image data may be obtained from an image sensor, such as the imaging sensor 1, or from a memory included in the device, from an external memory, etc., or from an artificial image generator, created via computer generated graphics, or the like.

The global image data, at 72, are input into a convolutional, neural network, such as CNN 22, for generating, at 73, output multispectral (MS) data, such as the output spectral data 18, as discussed above.

The global image data includes image data that may be represented by a number of color channels, such as Red, Green and Blue, or the like and spectral data.

The global image data represent a global image area, which includes more pixels represented by the obtained image data than the pixels represented by the spectral data, as discussed above.

At 74, the convolutional neural network transforms the obtained image data into the output spectral data based on the obtained spectral data.

The image data represent imaging information and the obtained spectral data represent spectral information, which corresponds to information acquired from a spectral imaging part of a photosensitive area of an imaging sensor.

At 75, the generated output spectral image data are output.

It should be recognized that the embodiments describe methods with an exemplary ordering of method steps. The specific ordering of method steps is however given for illustrative purposes only and should not be construed as binding.

The method as described herein is also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated, otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An imaging sensor comprising:
a photosensitive area including an imaging part and a spectral imaging part.

(2) The imaging sensor of (1), wherein the spectral imaging part includes a plurality of spectral imaging portions.

(3) The imaging sensor of (2), wherein the plurality of spectral imaging portions are distributed in the photosensitive area.

(4) The imaging sensor of (2), wherein at least a part of the plurality of spectral imaging portions are grouped in a region of the photosensitive area.

(5) An image processing device comprising circuitry configured to:
obtain global image data including image data and spectral data, the global image data representing a global image area;
input the global image data to a neural network for generating output spectral data, wherein the neural network is configured to transform the obtained image data into the output spectral data based on the obtained spectral data.

(6) The image processing device of (5), wherein the global image area includes more pixels represented by the obtained image data than pixels, represented by the obtained spectral data.

(7) The image processing device of (5) or (6), wherein the obtained spectral data represent spectral information and the obtained image data represent imaging information.

(8) The image processing device of (7), wherein the spectral information corresponds to information acquired from a spectral imaging part of a photosensitive area of an imaging sensor.

(9) The image processing device of anyone of (5) to (8), wherein the neural network is a convolutional neural network.

(10) The image processing device of (9), wherein the convolutional neural network is trained based on the obtained image data and the obtained spectral data.

(11) The image processing device of (9), wherein the convolutional neural network is trained to transform the obtained image data into the output spectral data based on spectral information acquired from a plurality of spectral imaging portions of a photosensitive area of an imaging sensor.

(12) The image processing device of anyone of (5) to (11), wherein the obtained image data are RGB image data and the obtained spectral data are multispectral or hyperspectral data.

(13) An image processing method comprising:
obtaining global image data including image data and spectral data, the global image data representing a global image area;
inputting the global image data to a neural network for generating output spectral data, wherein the neural network is configured to transform the obtained image data into the output spectral data based on the obtained spectral data.

(14) The image processing method of (13), wherein the global image area includes more pixels represented by the obtained image data than pixels represented by the obtained spectral data.

(15) The image processing method of (13) or (14), wherein the obtained spectral data represent spectral information and the obtained image data represent imaging information.

(16) The image processing method of (15), wherein the spectral information corresponds to formation acquired from a spectral imaging part of a photosensitive area of an imaging sensor.

(17) The image processing method of anyone of (5) to (16), wherein the neural network is a convolutional neural network.

(18) The image processing method of (17), wherein the convolutional neural network is trained based on the obtained image data and the obtained spectral data.

(19) The image processing method of (17), wherein the convolutional neural network is trained to transform the obtained image data into the output spectral data based on spectral information acquired from a plurality of spectral imaging portions of a photosensitive area of an imaging sensor.

(20) The image processing method of (17), wherein the convolutional neural network is trained based on a learning algorithm, the learning algorithm computing the loss function corresponding to the image data and the loss function corresponding to the spectral data.

(21) A computer program comprising program code causing a computer to perform the method according to anyone of (13) to (20), when being carried out on a computer.

(22) A non-transitory computer-readable recording medium that stores therein a computer program product, which, when executed by a processor, causes the method according to anyone of (13) to (20) to be performed.

The invention claimed is:

1. An image processing device comprising circuitry configured to:
   obtain global image data including image data and spectral data, the global image data representing a global image area, wherein the spectral data represents spectral information acquired from a plurality of spectral imaging portions distributed in a photosensitive area of an imaging sensor, and wherein the image data represents imaging information acquired from an imaging part of the photosensitive area;
   input the global image data to a convolutional neural network for generating output spectral data, wherein the convolutional neural network is configured to transform the obtained image data into the output spectral data based on the obtained spectral data, wherein the global image area includes more pixels represented by the obtained image data than pixels represented by the obtained spectral data,
   wherein the convolutional neural network is trained using:
      a back transformation that converts predicted spectral data to back-transformed image data using a physical model that integrates the spectrum according to color sensitivities;
      a first loss function computed between the obtained image data and the back-transformed image data;
      a second loss function computed between the obtained spectral data and the predicted spectral data; and
      a smoothening constraint applied to the predicted spectral data.

2. The image processing device of claim 1, wherein the obtained spectral data represent spectral information and the obtained image data represent imaging information.

3. The image processing device of claim 1, wherein the obtained image data are RGB image data and the obtained spectral data are multispectral or hyperspectral data.

4. An image processing method comprising:
   obtaining global image data including image data and spectral data, the global image data representing a global image area, wherein the spectral data represents spectral information acquired from a plurality of spectral imaging portions distributed in a photosensitive area of an imaging sensor, and wherein the image data represents imaging information acquired from an imaging part of the photosensitive area;
   inputting the global image data to a convolutional neural network for generating output spectral data, wherein the convolutional neural network is configured to transform the obtained image data into the output spectral data based on the obtained spectral data, wherein the global image area includes more pixels represented by the obtained image data than pixels represented by the obtained spectral data,
   wherein the convolutional neural network is trained using:
      a back transformation that converts predicted spectral data to back-transformed image data using a physical model that integrates the spectrum according to color sensitivities;
      a first loss function computed between the obtained image data and the back-transformed image data;
      a second loss function computed between the obtained spectral data and the predicted spectral data; and
      a smoothening constraint applied to the predicted spectral data.

5. The image processing method of claim 4, wherein the obtained spectral data represent spectral information and the obtained image data represent imaging information.

* * * * *